US008419439B2

(12) United States Patent
Cheung et al.

(10) Patent No.: US 8,419,439 B2
(45) **Date of Patent: *Apr. 16, 2013**

(54) APPARATUS AND RELATED METHODS FOR THE CONTROLLED ILLUMINATION OF A CONVEX SURFACE

(75) Inventors: Edward Cheung, La Puente, CA (US); Eric Poesch, Thousand Oaks, CA (US); Frank Adler, Oak Park, CA (US); Michael O'Connor, Thousand Oaks, CA (US)

(73) Assignee: Uncle Milton Industries, Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,877

(22) Filed: Feb. 7, 2012

(65) Prior Publication Data

US 2012/0148995 A1 Jun. 14, 2012

Related U.S. Application Data

(63) Continuation of application No. 11/877,226, filed on Oct. 23, 2007, now Pat. No. 8,133, 058.

(60) Provisional application No. 60/862,732, filed on Oct. 24, 2006.

(51) Int. Cl.
*G09B 23/00* (2006.01)

(52) U.S. Cl.
USPC .......... 434/285

(58) Field of Classification Search .......... 434/111, 434/130, 141, 145, 284–288; 362/35, 806, 362/809, 811
See application file for complete search history.

(56) References Cited

U.S. PATENT DOCUMENTS

| | | | | |
|---|---|---|---|---|
| 1,013,947 | A * | 1/1912 | Neil | 362/498 |
| 1,687,106 | A * | 10/1928 | Rae | 40/444 |
| 2,205,169 | A * | 6/1940 | Hallman | 362/361 |
| 2,496,827 | A * | 2/1950 | Tellier | 434/143 |
| 2,861,173 | A * | 11/1958 | Nordquist | 362/150 |
| 3,348,321 | A * | 10/1967 | Cunningham | 434/142 |
| 3,808,721 | A * | 5/1974 | Gersch | 40/432 |
| 4,173,038 | A * | 10/1979 | Kiefer | 362/35 |
| 5,324,224 | A * | 6/1994 | Anderson et al. | 446/91 |
| RE36,662 | E * | 4/2000 | Galison | 368/18 |
| 6,575,613 | B2 * | 6/2003 | Brown et al. | 362/565 |
| 6,679,618 | B1 * | 1/2004 | Suckow et al. | 362/247 |
| 6,854,871 | B1 * | 2/2005 | Morton | 362/565 |
| 8,133,058 | B2 * | 3/2012 | Cheung et al. | 434/285 |
| 2004/0007710 | A1 * | 1/2004 | Roy et al. | 257/88 |
| 2007/0291488 | A1 * | 12/2007 | Heathcock | 362/276 |

* cited by examiner

*Primary Examiner* — Gene Kim
*Assistant Examiner* — Alyssa Hylinski
(74) *Attorney, Agent, or Firm* — Frost Brown Todd LLC

(57) ABSTRACT

Illumination provided to the interior of a convex surface can be controlled using a plurality of internal barriers separating light sources such as light emitting diodes. Such controlled illumination can simulate phases of the moon using logic which can be limited to yes or no Boolean decisions, thereby minimizing the complexity of required input.

15 Claims, 11 Drawing Sheets

SECTION A-A

APPARATUS AND RELATED METHODS FOR THE CONTROLLED ILLUMINATION OF A CONVEX SURFACE

CROSS REFERENCE TO RELATED APPLICATION

This application is a continuation of, and claims the benefit of, U.S. nonprovisional patent application Ser. No. 11/877,226, filed on Oct. 23, 2007 with the title Apparatus and Related Methods for the Controlled Illumination of a Convex Surface, which application itself is related to and claims priority from provisional patent application 60/862,732 filed on Oct. 24, 2006, the disclosures of both of those applications are hereby incorporated by reference in full.

FIELD

Various implementations of the disclosure of this application relate to an apparatus for controlled illumination of a convex surface. Certain of those implementations are particularly described in terms of an apparatus for simulating the phases of the moon.

BACKGROUND

It is well known that simulations of the moon and other celestial objects can be used to provide entertainment and education. Using the disclosure set forth herein, one of ordinary skill in the art could provide a simulation of celestial objects such as the moon using an apparatus which is suitable for mounting on walls or other surfaces in individual rooms.

DETAILED DESCRIPTION

Figure 1A:
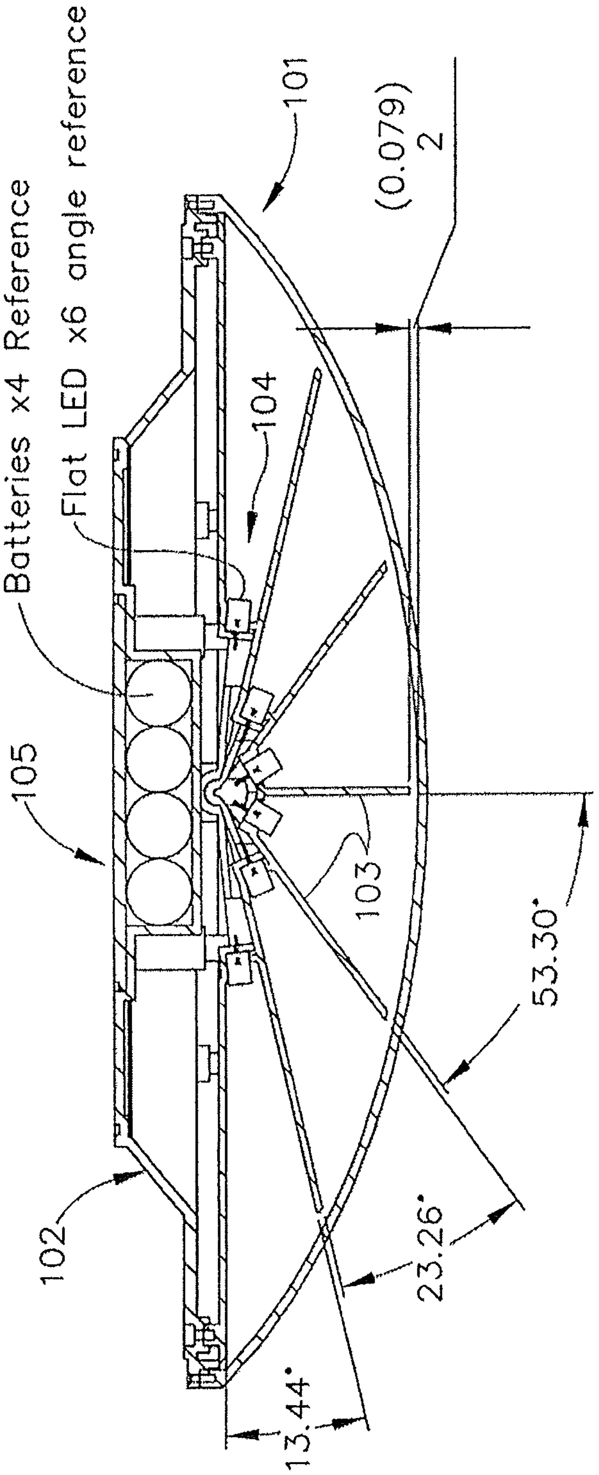
FIG. 1*a* depicts a cross section of an embodiment in which illumination provided to the interior of a convex surface is controlled through the use of internal barriers.
Figure 1B:
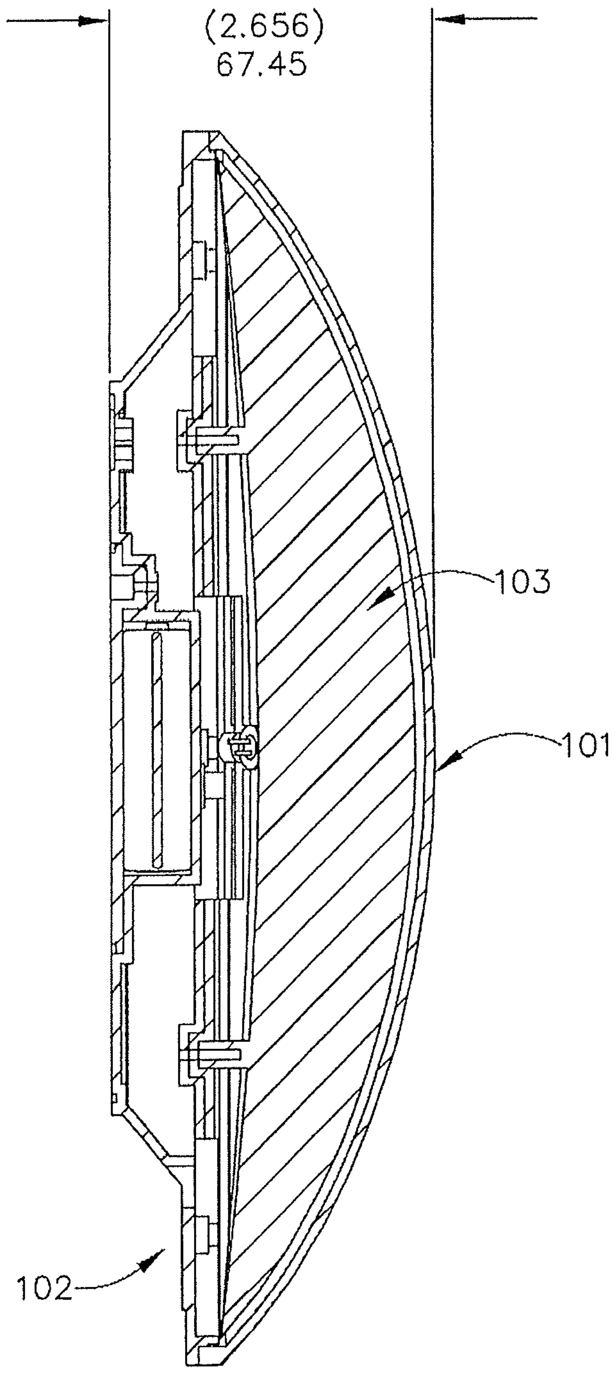
FIG. 1*b* depicts a cross section of an embodiment in which illumination provided to the interior of a convex surface is controlled though the use of internal barriers.
Figure 1C:
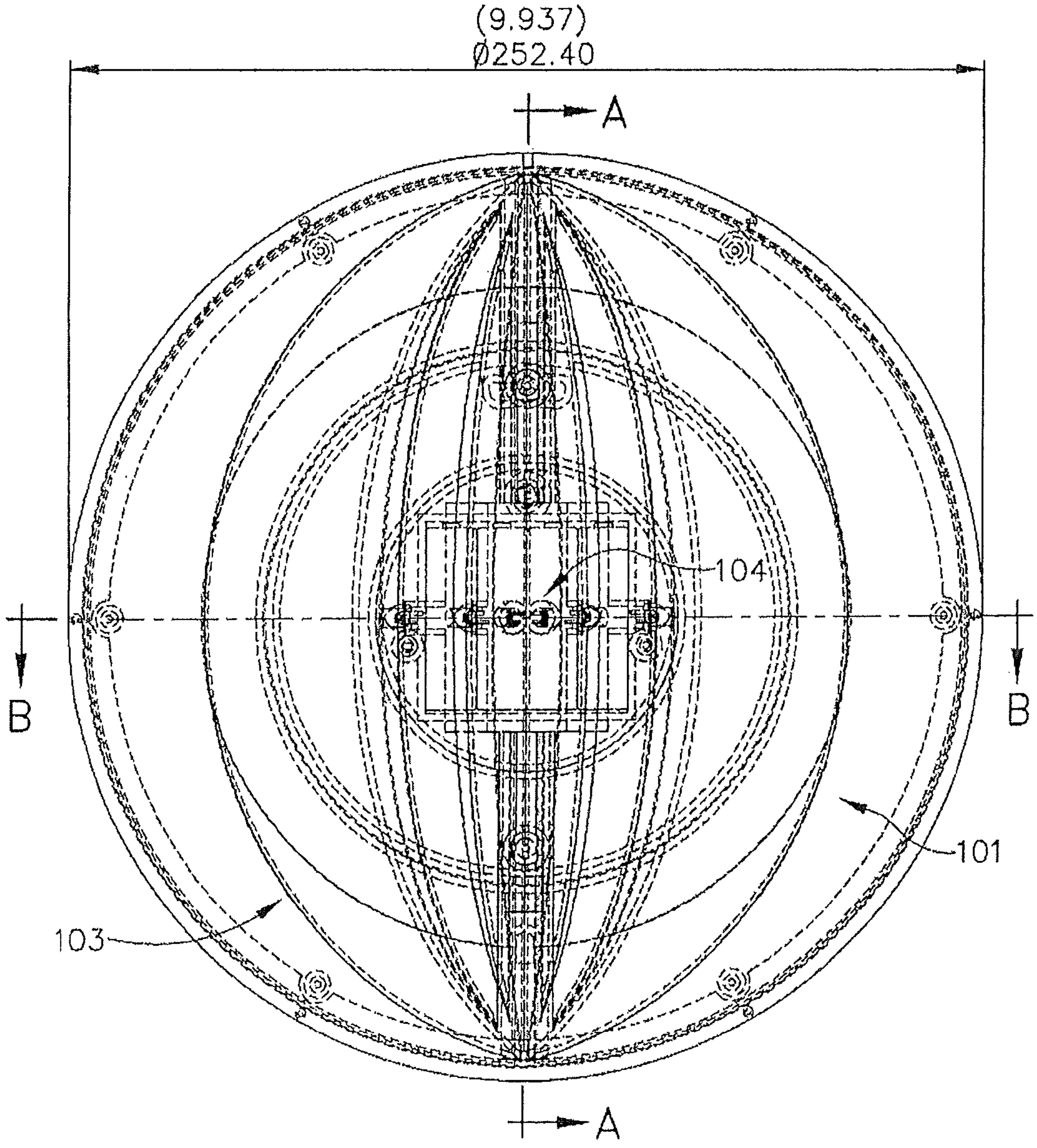
FIG. 1*c* depicts a front view of an embodiment in which illumination provided to the interior of a convex surface is controlled through the use of internal barriers.

Turning to the diagrams, FIG. 1*a* depicts a cross sectional view of an apparatus implemented according to this disclosure taken along line B-B of FIG. 1*c*. In FIG. 1*a*, a convex outer surface [101] is disposed adjacent the body [102]. The body [102] is shaped to contain a plurality of barriers [103], being opaque and having a thickness of less than 2 mm, which divide the interior of the convex outer surface [101] into illuminable regions. As depicted in FIG. 1*a*, the barriers [103] may be disposed so that there is a consistent distance between the edges of the barriers [103] and the interior of the convex surface [101]. Between each pair of barriers [103] is disposed a light emitting diode (LED) [104], the diodes [104] themselves being connected to a bank of batteries [105] carried by the body [102]. In the depicted embodiment, the batteries [105] consist of four AA batteries, although any suitable power source may be used. The body [102] may additionally comprise a cutout (not shown in FIG. 1*a*) into which can be inserted a wall hanger. Additionally, the apparatus of FIG. 1*a* may include a light sensor (not shown) such as an infrared sensor which can be used to determine if the apparatus is located in an environment with low enough ambient light that the illumination provided by the LEDs [104] can be seen.

Figure 7A:
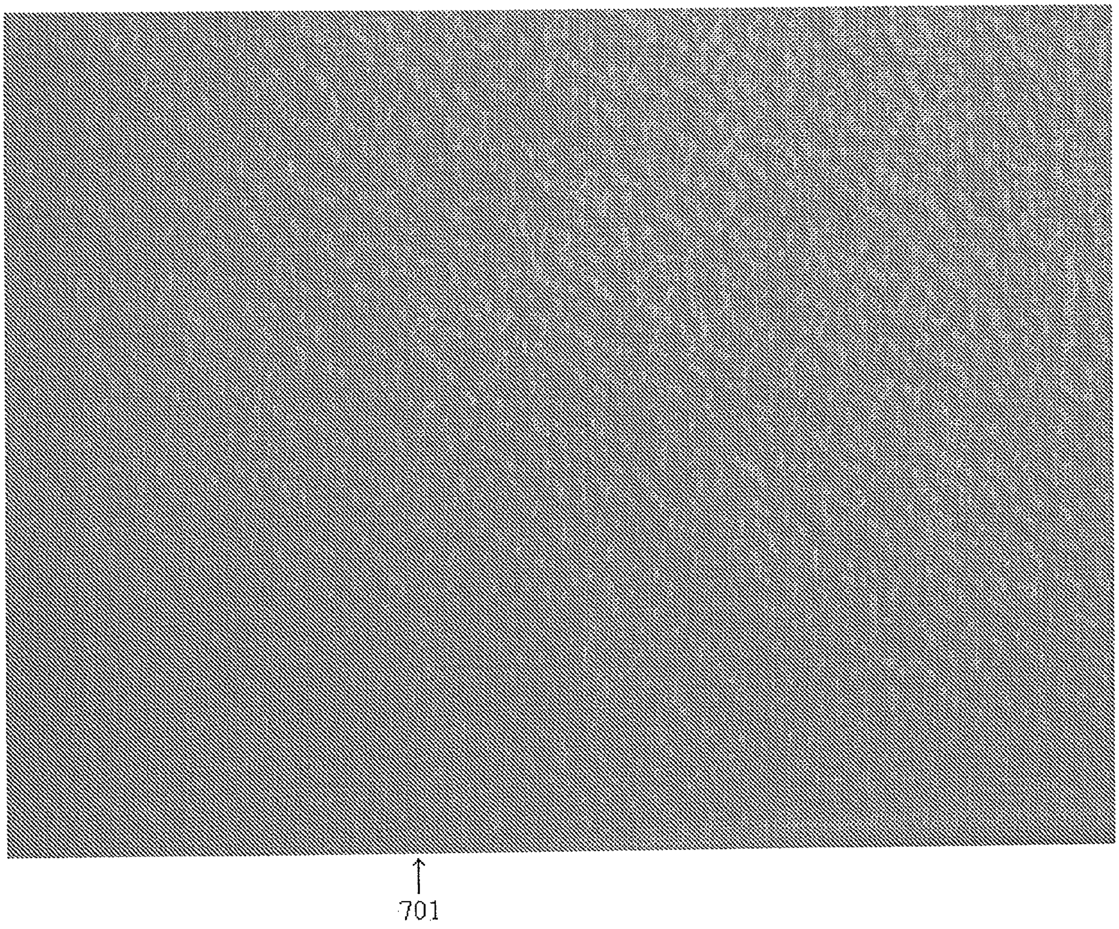
FIGS. 7*a*-7*b* depict a texture which can be applied to barriers in an embodiment of the type shown in FIGS. 1*a*-1*c*, with FIG. 7*b* additionally depicting a quarter for scale.
Figure 7B:
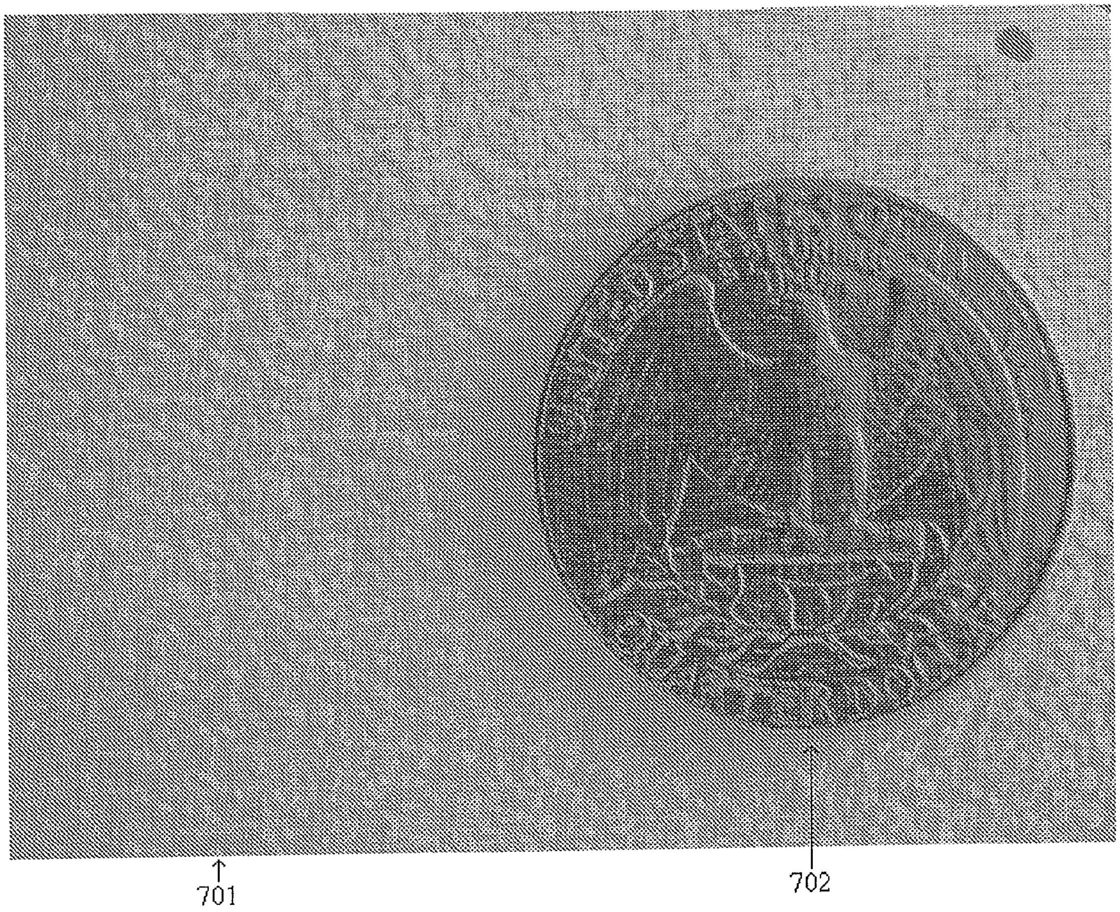

In embodiments constructed in accordance with FIG. 1*a*, certain variations of the basic design depicted in that figure may be made to avoid undesirable effects, such as illuminated "hot spots" on the convex surface [101]. One such adjustment which may be included in an embodiment constructed in accordance with FIG. 1*a* is to include texturing on one or both exterior surfaces of the barriers [103] of the apparatus body [102]. In particular, in the case of an apparatus created using injection molded plastic, after the tooling used for creating the body [102] has been tested and approved regarding form and fit, the interior of that tooling can be modified with a texture suitable for dispersing light, such as a coarse, random texture. One example of such a texture [701] is designated MT-11100, produced by Roehlen Industries, and depicted in FIGS. 7*a*-7*b*, having a depth of 0.006 and an angle of 9. Additionally, FIG. 7*b* depicts a quarter [702] disposed on said texture [701] for the purpose of providing a scale reference.

Similarly, the interior of the convex surface [101] can be textured to create a soft even texture, such as that obtained through the use of a sand blasting process, which is suitable for the diffusion of light. In some cases, the material and construction of the convex surface [101] can be selected to achieve desired effects. For example, translucency can be created by molding the surface out of white plastic to a thickness of 2-3 mm. Alternatively, variable levels of translucency can be obtained by creating a convex surface [101] from a clear ABS plastic base with white ABS additives to achieve a desired translucency, such as by being opaque enough to conceal the barriers [103], while still being more translucent than the 2-3 mm white plastic described earlier. One particular composition which has been found to be suitable is to use a base of high impact polystyrene and to mix 115 grams of white plastic coloring for every 55 pounds of base. As yet an additional alternative, the convex surface [101] might be created entirely from clear plastic (or some other material) and then coating, such as with paint, either the interior, or the exterior, or both of the surface [101] white to achieve translucency.

FIG. 1*b* is a cross sectional view of the embodiment of FIG. 1*a*, taken along line AA of FIG. 1*c*. FIG. 1*c* depicts a front view of the embodiment depicted in FIGS. 1*a* and 1*b*.

Figure 2:
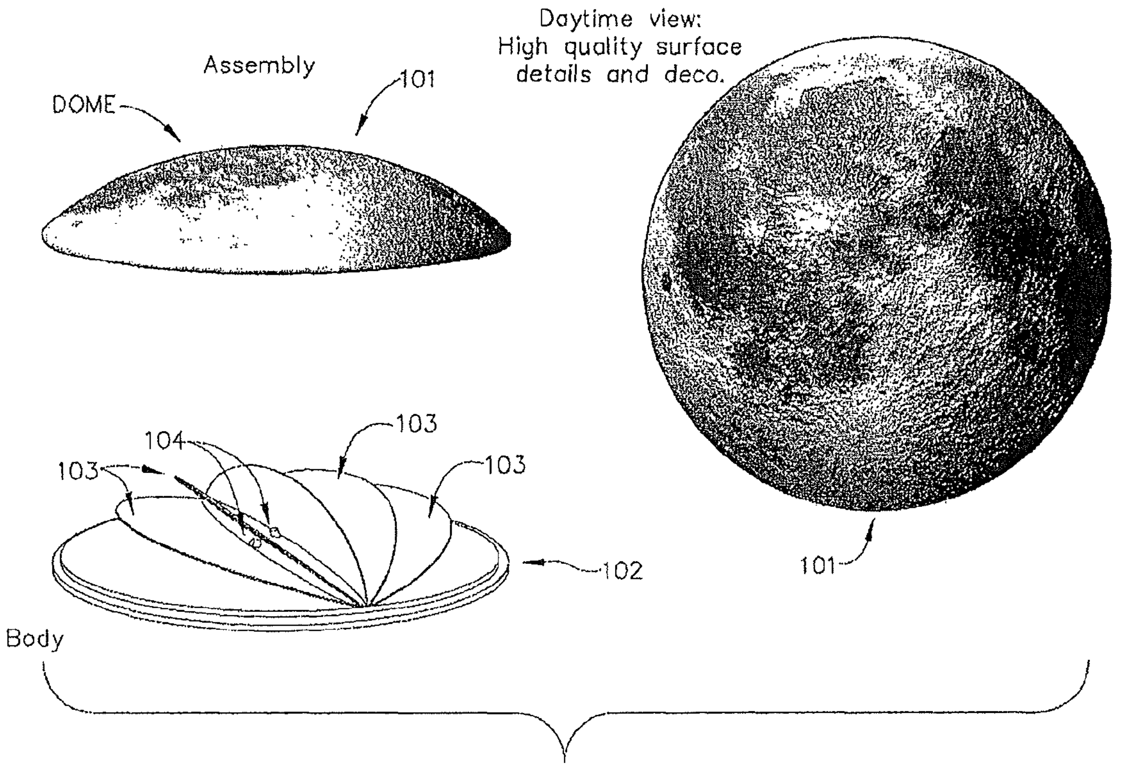
FIG. 2 depicts one method by which an embodiment following FIGS. 1*a*-1*c* can be assembled.

Turning to FIG. 2, that diagram shows how the embodiment of FIGS. 1*a*-1*c* can be assembled for use in simulating the phases of the moon. Note that in FIG. 2, the Dome [101] (referred to as a convex surface in FIGS. 1*a*-1*c*) is marked (e.g., by painting, variable relief sculpting, or some other visually perceptible method) with a design depicting the surface of the moon. Note also that in FIG. 2, the Dome [101] is registered in a specific orientation relative to the partitions [103] in the body [102]. In the depicted embodiment, this orientation is used to achieve realism in the depiction of the moon's phases as different combinations of interior sections are illuminated by the LEDs [104] as appropriate. However, as will be obvious to one of ordinary skill in the art in light of this disclosure, an apparatus according to FIGS. 1*a*-1*c* depicting the phases of the moon is not required to be assembled in a manner such that the dome [101] is registered in a specific orientation relative to the body [102]. Alternatively, the dome [101] and body [102] might be separable, with the dome [101] and body [102] comprising either physical (e.g., complimentarily shaped male and female components) or descriptive (e.g., labels) features which can allow the dome [101] and the body [102] to be assembled in the desired orientation. Similarly, while FIGS. 1*a*-1*c* depict particular measurements, it should be understood that those measurements, and the specific form and disposition of elements in those figures, are depicted for purposes of illustration only, and are not intended to be limiting on the scope of the invention.

Figure 3A:
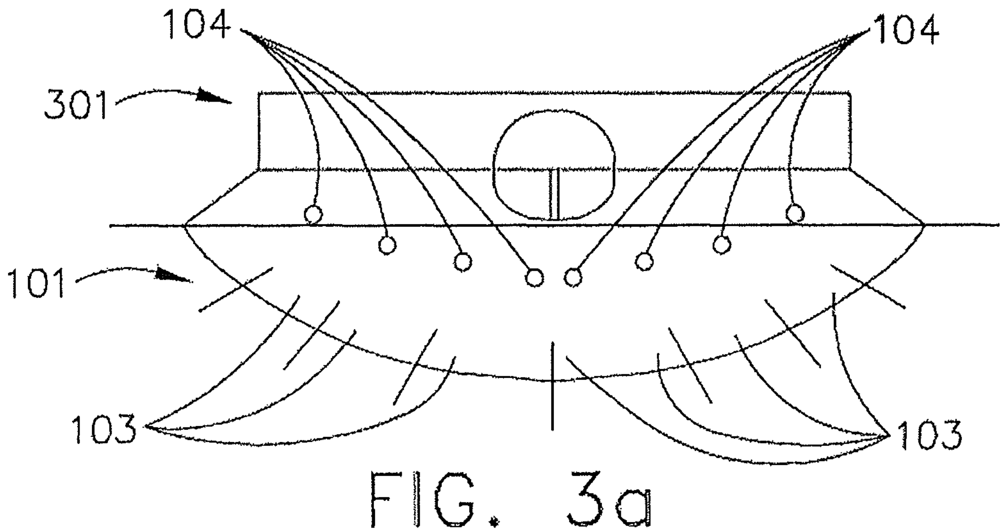
FIG. 3*a* depicts an alternate embodiment in which illumination provided to the interior of a convex surface is controlled through the use of internal barriers and a method for the assembly thereof
Figure 3B:
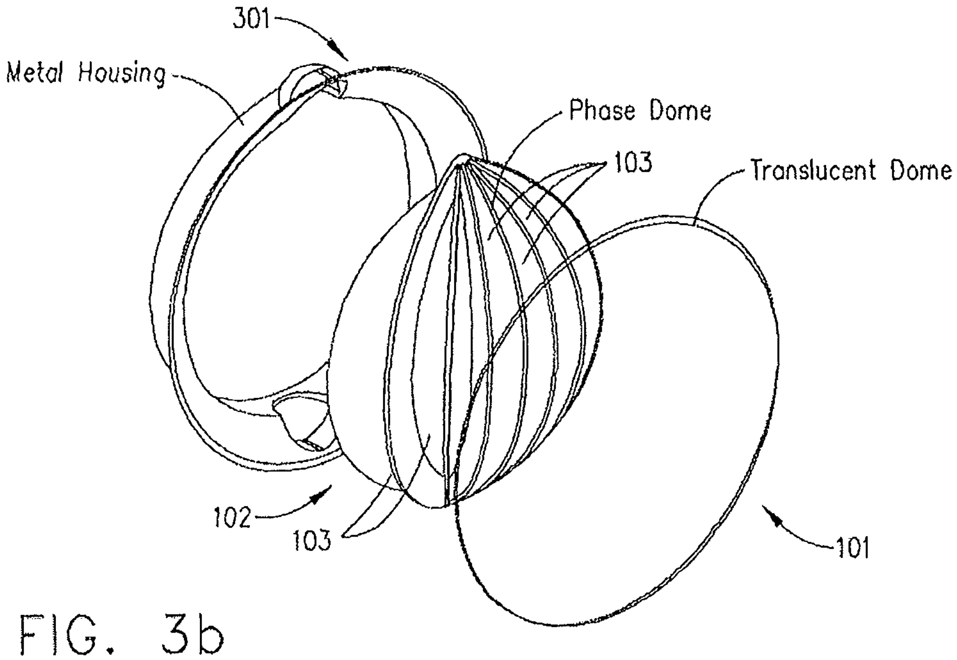
FIG. 3*b* depicts an exploded perspective view of an embodiment constructed according to the diagram of FIG. 3*a*.

As an example of an alternate embodiment consistent with the present invention, consider the diagram of FIGS. 3*a*-3*b*. FIG. 3*a* depicts a cross sectional view of an alternate embodiment in which, rather than including barriers [103] dividing the interior of the dome [101] into six sections as shown in FIG. 1*a*, has barriers [103] dividing the interior of the dome [101] into 8 sections. Similarly, the diagram of FIG. 3*b* depicts assembly of that embodiment from three components: the dome [101]; the phase dome (referred to as the body in FIGS. 1*a*-1*c*) [102] and a main housing [301], rather than the two components depicted in FIG. 2. Similarly, while the discussion of FIGS. 1*a*-1*c* described that embodiment as comprising a cutout for mounting the apparatus on a wall, the invention is not limited to being mounted on a wall using a cutout, and could alternately include other features which could be used for mounting on walls or other surfaces (e.g., screws, adhesives, Velcro, suction cups, or other similar features).

Figure 4A:
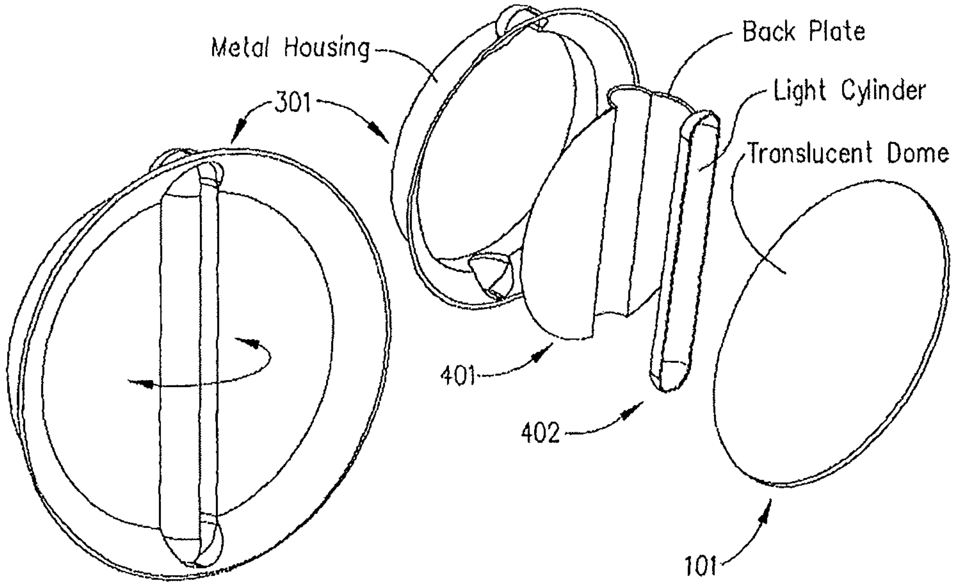
FIG. 4*a* depicts an exploded perspective view of an alternate embodiment in which is illumination provided to the interior of a convex surface by the use of variously configured light cylinders.
Figure 4B:
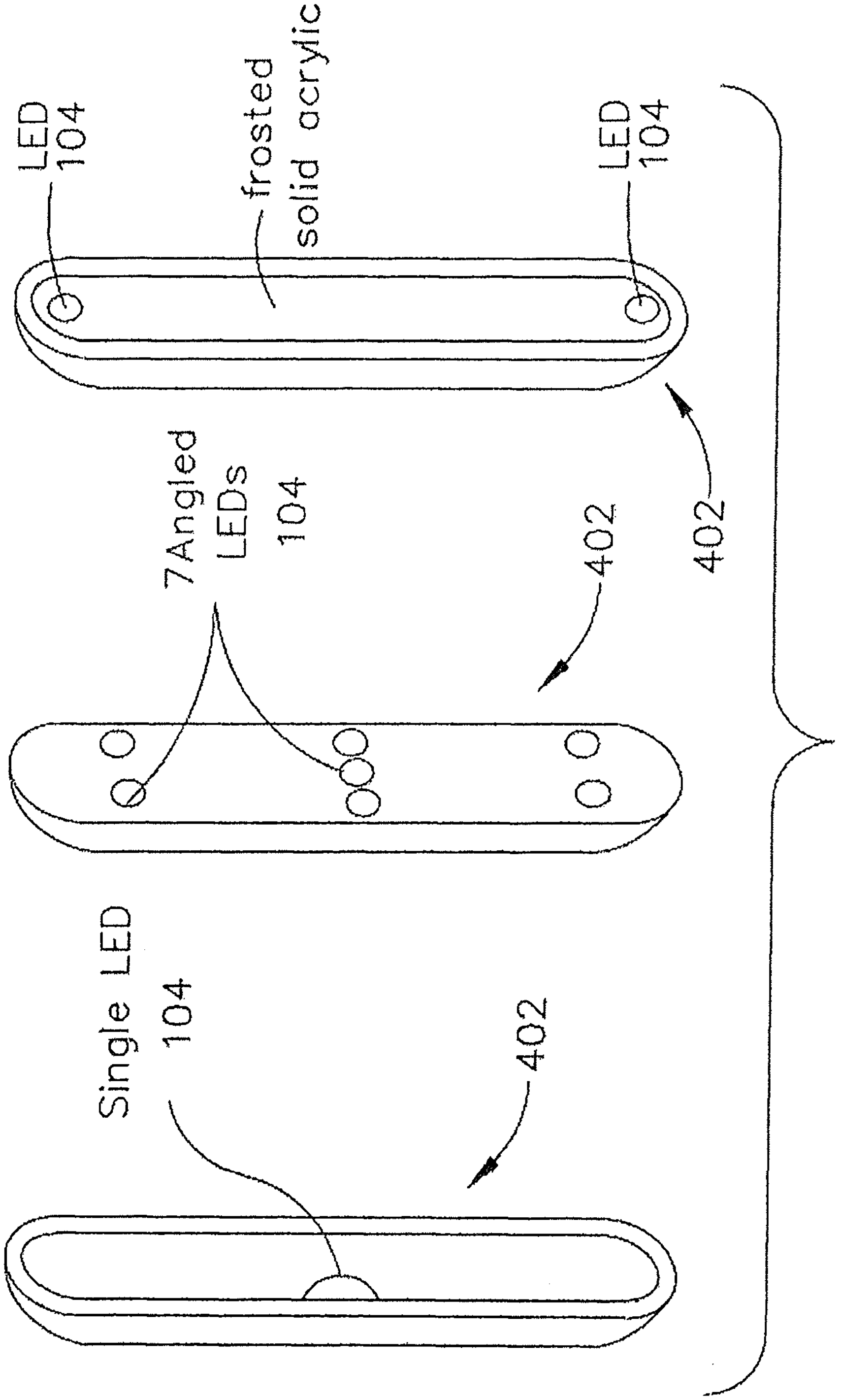
FIG. 4*b* depicts an alternate embodiment in which illumination is provided to the interior of a convex surface by the use of variously configured light cylinders.

As yet another example of an alternate embodiment which could be implemented based on the disclosure set forth herein, consider the diagrams of FIGS. 4*a*-4*b*. Diagram 4*a* depicts the assembly of an embodiment in which, rather than including barriers as in FIGS. 1*a*-1*c*, illumination is controlled by a light cylinder [402] which is rotatable either manually (e.g., by a knob) or mechanically (e.g., by a motor) to cast light on the appropriate portions of the dome [101] as desired, and which is configured to interface with a back plate [401] which can be inserted into the main housing [301] of the apparatus. As shown in FIG. 4*b*, in embodiments utilizing a light cylinder [402], the cylinder [402] can be designed in various configurations, such as utilizing a single light source [104], multiple light sources [104], or light sources [104] combined with intermediary distributive media (e.g., frosted acrylic as shown). Of course, it should be understood that, while the embodiments described in this disclosure have made use of LEDs for illumination, any suitable illumination sources, such as incandescent light or florescent light might alternatively be used, though LEDs are advantageous due to their relatively low cost and power consumption. Similarly, for reasons of power consumption (as well as reasons of durability and noise), an embodiment according to FIGS. 1*a*-1*c* has an advantage over an embodiment of the type depicted in FIGS. 4*a*-4*b*, because the embodiment shown in FIGS. 1*a*-1*c* can be implemented without requiring the use of moving parts to cycle between phases of the moon. Of course, it should be understood that variations on the embodiment of FIGS. 1*a*-1*c* could employ moving parts (e.g., replacing multiple barriers with a single moving barrier, or retaining the use of multiple barriers but making those barriers movable).

Figure 5:
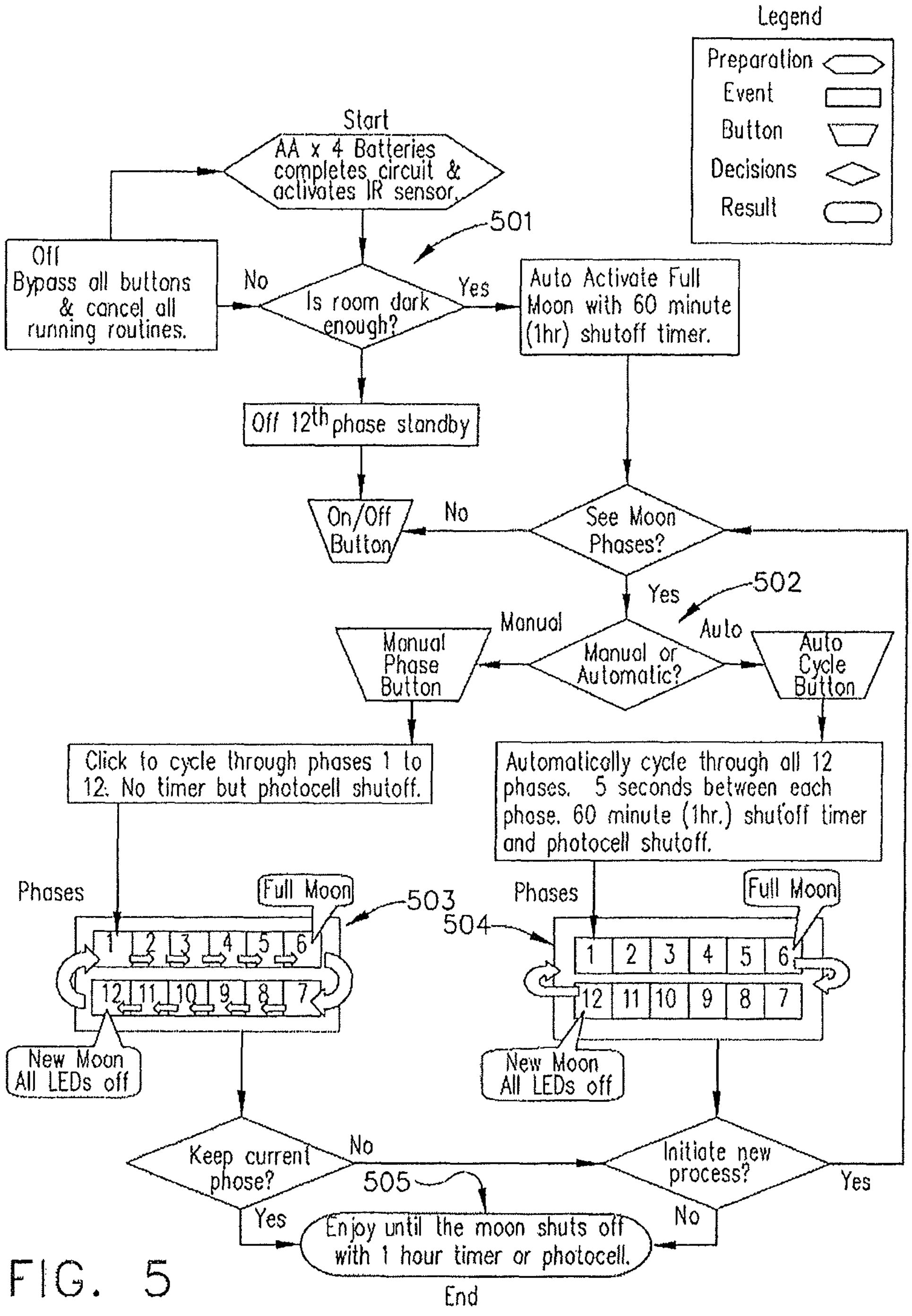
FIG. 5 depicts logic in the form of a flowchart which can be used for controlling an apparatus of the type shown in FIGS. 1 *a*-1*c*.

Turning now to FIG. 5, that figure depicts a flow chart of steps which can be used in combination with an apparatus of the type depicted in FIGS. 1*a*-1*c* for simulating the phases of the moon. As shown in FIG. 5, a process for simulating phases of the moon can include a step [501] which checks whether the apparatus' environment is dark enough for the phases of the moon to be perceptible. If the phases are perceptible, a check [502] can be made to determine if the phases should be automatically cycled through, or manually selected. The phases of the moon can then be simulated, either by manual selection [503] or by automatic cycling [504] until the apparatus is deactivated [505], for example by detection by a photocell of excess light in the surrounding environment or expiration of a timer.

Figure 6:
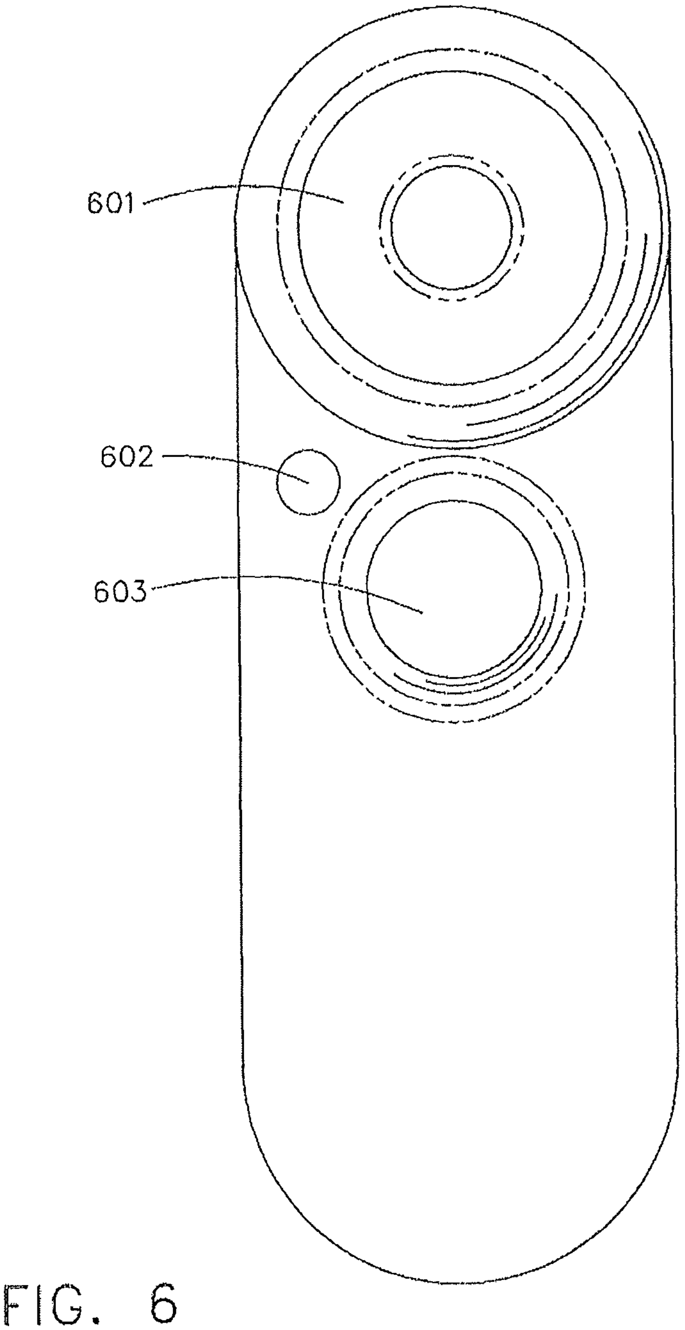
FIG. 6 depicts a control which can be used to provide input to the logic of the flowchart shown in FIG. 5.

With reference to FIG. 5 note that, even in manual mode, the decisions in that chart require only yes/no binary inputs. While the invention is not limited to systems which include only such binary logic, the use of that logic allows an apparatus such as that depicted in FIGS. 1*a*-1*c* to be operated using controls having only low complexity (which translates into both low cost and increased ease of use). One such suitable control is the remote control depicted in FIG. 6, which provides the user with only three buttons for controlling the apparatus: a manual phase button [601], an on/off phase button [602], and an automatic phase button [603]. Of course, it should be understood that the invention is not limited to the use of remote controls, or even to the use of controls having the same buttons as depicted in FIG. 6. Alternatively, fewer buttons could be incorporated (e.g., the manual [601] or automatic [603] phase buttons from FIG. 6 could be eliminated though removal of the corresponding alternate pathways from FIG. 5) or more buttons, or different controls all together could be used (e.g., a control could include a slider, dial, knob or other device which controls how quickly the associated apparatus cycles through its phases).

The above disclosure, and the diagrams which are considered a part of the teachings of this application, accordingly enable one of ordinary skill in the art to make and use the present invention, which is suitable for educational, entertainment, decorative, and other purposes. While the above disclosure described particularly an embodiment of the invention intended for use in simulating the phases of the moon, other embodiments and modifications obvious to one of ordinary skill in the art in light of this disclosure are included within the scope and spirit of the invention. Thus, this disclosure should be understood as illustrative only, and not limiting. In light of the above,

We claim:

1. A system comprising:

a. a translucent convex surface;

b. a back portion;

c. one or more opaque barriers, each of said one or more opaque barriers comprising one or more projections;

d. a plurality of illumination sources;

wherein:

i. the translucent convex surface comprises a circular base;

ii. the one or more opaque barriers are arranged so that their respective projections divide a volume between the translucent convex surface and the back portion into a plurality of wedges, each wedge comprising:

A. two walls, at least one of the two walls being formed by an opaque barrier from the plurality of opaque barriers, wherein the opaque barrier from which the at least one wall is formed also forms at least one wall for at least one other wedge from the plurality of wedges; and B. an angle, the angle having sides formed by the two walls, and a vertex closer to the back portion than to the translucent convex surface, wherein the separation between the two walls proximate to the vertex is less than the separation between the two walls proximate to the translucent convex surface; and C. a curved outer surface, the curved outer surface formed by the translucent convex surface;

iii. the illumination sources from the plurality of illumination sources are disposed such that each wedge from the plurality of wedges contains one or more illumination sources from the plurality of illumination sources.

2. The system of claim 1, wherein:

i. for each wedge from the plurality of wedges, the angle of the wedge increases as the wedges approach a center of the translucent convex surface;

ii. the angles of the wedges from the plurality of wedges comprise a first angle and a second angle; and iii. the first angle is greater than the second angle.

3. The system of claim 1, wherein:

a. the plurality of wedges comprises six wedges; and b. the angles of the wedges from the plurality of wedges comprise a first angle and a second angle, wherein the first angle is different from the second angle.

4. The system of claim 3, wherein:

a. each wedge from the plurality of wedges has a closer wall closer to the back portion and a farther wall farther from the back portion;

b. for each wedge from the plurality of wedges, the angle of a first wedge is equal to the angle of a second wedge when an angle between the farther wall from the first wedge and the back portion is equal to an angle between the farther wall from the second wedge and the back portion.

5. The system of claim 1, wherein the plurality of wedges comprises two wedges having a wall formed by the back portion.

6. The system of claim 1, wherein each barrier from the one or more opaque barriers comprises a curved outer portion having curvature matching the interior of the translucent convex surface.

7. The system of claim 1, wherein the translucent convex surface is permanently marked with a design depicting a celestial object.

8. The system of claim 1 further comprising a control operable to simulate a set of phases for the celestial object.

9. The system of claim 8, wherein:

a. the celestial object is the moon; and b. simulating the set of phases for the celestial object comprises cyclically transitioning between full moon and new moon.

10. A system comprising:

a. a translucent convex surface;

b. a back portion;

c. one or more opaque barriers, each of said one or more opaque barriers comprising one or more projections;

d. a plurality of illumination sources;

wherein:

i. the translucent convex surface comprises a circular base;

ii. the one or more opaque barriers are arranged so that their respective projections divide a volume between the translucent convex surface and the back portion into a plurality of wedges, each wedge comprising:

A. two walls, at least one of the two walls being formed by an opaque barrier from the plurality of opaque barriers; and B. an angle, the angle having sides formed by the two walls, and a vertex closer to the back portion than to the translucent convex surface, wherein the separation between the two walls proximate to the vertex is less than the separation between the two walls proximate to the translucent convex surface; and C. a curved outer surface, the curved outer surface formed by the translucent convex surface;

iii. the illumination sources from the plurality of illumination sources are disposed such that each wedge from the plurality of wedges contains one or more illumination sources from the plurality of illumination sources;

wherein the angles of the wedges from the plurality of wedges comprise a first angle and a second angle, wherein the first angle is different from the second angle.

11. The system of claim 10, wherein:

i. for each wedge from the plurality of wedges, the angle of the wedge increases as an angle between the back portion and a shorter wall from the wedge approaches perpendicular; and ii. the first angle is greater than the second angle.

12. The system of claim 10, wherein the plurality of wedges comprises six wedges.

13. The system of claim 12, wherein:

a. each wedge from the plurality of wedges has a closer wall closer to the back portion and a farther wall farther from the back portion;

b. for each wedge from the plurality of wedges, the angle of a first wedge is equal to the angle of a second wedge when an angle between the farther wall from the first wedge and the back portion is equal to an angle between the farther wall from the second wedge and the back portion.

14. The system of claim 10, wherein:

i. for each wedge from the plurality of wedges, the angle of the wedge increases as the wedges approach a center of the translucent convex surface;

ii. the angles of the wedges from the plurality of wedges comprise a first angle and a second angle; and iii. the first angle is greater than the second angle.

15. The system of claim 10, wherein:

i. for each wedge from the plurality of wedges, the angle of the wedge increases as a length of a line from the illumination source contained in the wedge and the translucent convex surface decreases;

ii. the angles of the wedges from the plurality of wedges comprise a first angle and a second angle; and iii. the first angle is greater than the second angle.

* * * * *